Patented Oct. 17, 1939

2,176,099

UNITED STATES PATENT OFFICE 2,176,099

FLUORESCENT MATERIAL AND METHOD OF PREPARING THE SAME

Carl Pfanstiehl, Highland Park, Ill., assignor to Pfanstiehl Chemical Company, a corporation of Illinois No Drawing. Application February 16, 1938, Serial No. 190,880

15 Claims. (Cl. 250—81)

This invention relates to an improved fluorescent material and a method of preparing it. It is particularly concerned with activated zinc ortho-silicate.

Fluorescent materials of a wide variety of types have been heretofore produced. One of the best known of these is zinc silicate with which is usually employed an activator consisting of a manganese compound. Heretofore this material has been produced by fusing or sintering the material into a large block and then crushing and grinding the resulting mass. As a result there is produced free-flowing irregular semi-crystalline material which, under the microscope, will be found to contain large splinters and integral conglomerates, somewhat rounded at the edges and crisscrossed by breaks and cracks. With material of this type a manganese content of over ½ of 1% tends to act as a poison and is avoided.

In preparing fluorescent elements from the prior art material, various expedients are employed to affix it to the base. which is usually a glass tube. The most common expedient is to employ a binder of one type or another, the zinc silicate being suspended in a liquid including the binder and being spread on the surface of the glass, the volatile portion of the liquid then being evaporated. Even when attached in this manner the tubes are extremely fragile and the binder very greatly reduces the fluorescence of the element. Attempts have also been made to fuse the material into the tube, which amounts to using the glass as the binder and is subject to all of the defects of using other binders. No known way existed of applying fluorescent material without a binder to produce a fluorescent element capable of withstanding ordinary handling and transportation.

In accordance with the present invention an entirely new form of fluorescent material is produced consisting of minute unground crystals, flocculent as distinguished from free-flowing, having extraordinarily great fluorescent properties, and at the same time capable of attachment to a base without the use of a binder. The new material consists of surprisingly uniform crystals approximating one micron in diameter on the average, with a maximum generally of about two microns. These crystals, apparently because of their small size, attract each other and form loose clusters resembling snowballs which makes the material flocculent as distinguished from free-flowing.

The preferred material produced in this manner is zinc silicate and for this purpose the preferable starting materials are zinc oxide (ZnO), silicic acid ($H_2SiO_3$) and manganese dioxide ($MnO_2$). The silicic acid formula given is only approximate since the exact ratio of $SiO_2$ to $H_2O$ is not controllable. In all cases the materials should be of the highest purity, that is, of reagent grade or higher.

The materials are employed in proper proportions to produce the zinc ortho-silicate ($Zn_2SiO_4$), according to the formula $$2ZnO + H_2SiO_3 \rightarrow Zn_2SiO_4 + H_2O.$$

This means approximately 67.58 parts of ZnO to 32.42 parts of silicic acid. To 100 parts of this mixture, it is preferred to use at least 1½ parts of manganese dioxide and preferably about 2 parts. Lower percentages of manganese dioxide produce less brilliance, and a different shade of fluorescence.

The use of 5% excess of either $H_2SiO_3$ or of ZnO does not appear to affect the result.

All these materials are in the form of fine powders and they are mixed and a liquid such as methanol added. They are then milled in a hard porcelain ball mill for a considerable period. The character of the ball milling operation is quite important inasmuch as the use of heavy balls falling relatively large distances may spoil the process. It is preferred to use light pebbles of ½″ to ¾″ size with the mill running slightly under normal speed so that the pebbles roll lightly over one another without any considerable shock. The material is milled in this manner preferably for 20 to 22 hours.

The use of larger balls such as 1¼″ or greater produces a material which does not appear properly to react in the furnace. The reason for this is not known. The preferred treatment appears to cause a coating by one of the materials of the particles of the other.

After thorough mixing in the ball mill, the suspension is dried and the powder carefully brushed through a 200-mesh screen. The powder is then carefully packed into a crucible for heat treating. This packing should be such as not to pack the material too tightly, otherwise hard sintered particles of uneven grain size will result. A 4 inch inside diameter tube 13½ inches long containing approximately 3.1 lbs. of the material produces a suitable density.

The powder is then heated in a furnace to cause interaction of the zinc oxide and silicic acid without sintering or fusing of the material. The heating time up to 2000° F. is immaterial and may be rapid or slow. Above 2000° F., at least ½ hour should be employed to bring the temperature from 2000° F. to the maximum point which is 2320° F., plus or minus approximately 75°. Preferably the temperature is held at 2320° F. by a standard pyrometer controller, for example, as measured by a standard platinum against a platinum—10% rhodium thermocouple. The temperature should be held at about 2320° F. for 1¼ to 1¾ hour and then dropped to 2000° F. in from 15 minutes to ½ hour. After that, the powder can be held, if desired, at 2000° F. or less indefinitely. Various batches of material will require somewhat different heat treatment and trial runs may be necessary on each new batch of material.

If the heating has been too fast, or too low a temperature has been employed, there will be slightly yellow streaks in the powder and its fluorescent properties will be poor. If the temperature rises much above 2320° F., even for a very few minutes, it is not uniformly fluorescent, and if held for any considerable time, say, at 2400° F. becomes much harder and shrinks to about ¼ the original volume. At lower temperatures, say, at 2270° F. a much longer time of treatment is required. If left too long at 2320° F. the material becomes too hard.

When properly treated, the powder shrinks to approximately ⅔ or ¾ of its original volume. At this stage of the process the material is in the form of a solid block, which will withstand some transportation and handling but which will crumble readily to a fine powder without grinding. Grinding is carefully avoided. It may be broken up by light rolling or even between the fingers. It is somewhat like a soft lump of powdered sugar which will crumble to powder with a shock or between the fingers.

The powder so produced is then used in any desired manner as a fluorescent material. Preferably it is suspended in a volatile liquid to form a cream and is then poured through a glass tube, such amounts being left on the wall as will stick. The suspension used is creamy.

The liquid is then evaporated. For some reason which is not understood the zinc silicate adheres to the tube and will withstand dropping, handling, transportation, and even bending of the tube at right angles without breaking loose in any substantial quantities. It may, however, be readily rubbed from the surface with a cloth or with the finger. Other volatile liquids may be used, but do not appear to be as effective.

The resulting fluorescent element, or the zinc silicate alone, is very much more brilliant than zinc silicate heretofore produced, apparently because each crystal is unbroken or uncracked and because of the small uniform size thereof.

The preferred thickness of the coating is from 8 to 11 ten thousandths of an inch.

The flocculent character of the powder is transmitted to the coating and this permits the light to penetrate the coating to a much greater degree. At the same time the fluorescent radiation can emerge in the same manner. Thus, both the exciting ultra violet rays, and the resulting visible radiation are interfered with to a minimum degree.

When silicic acid is used as a starting material, improved results are also obtained over prior materials even though the powdered material is not produced, and instead, the mass is sintered, providing larger amounts of manganese dioxide are employed than were heretofore recommended. For this purpose, more than ½% and preferably more than 1% of manganese dioxide should be used.

The preferred very fine unbroken crystalline fluorescent material appears to have the same chemical composition as the prior art material. The index of refraction of the crystals appears to be the same.

At least 50% or more by number of the visible particles of the finely powdered material consists of unbroken crystals from ¼ to 1 micron in cross-section. Not more than 5% by number of the particles appear to be over 2 microns in cross-section.

A preferred method of heat treating the material is to enclose it in alundum or other suitable ceramic tubes closed at each end with loosely fitting ceramic disks, these being then pushed at uniform speed through a tube furnace wherein they reach maximum temperature at approximately the midpoint of the tube.

$SiO_2$ may be used in place of the $H_2SiO_3$, but is more difficult to handle or control.

The foregoing detailed description has been given for clearness of understanding only, and no unnecessary limitations should be understood therefrom, but the appended claims should be construed as broadly as permissible in view of the prior art.

I claim:

1. A loose flocculent fluorescent material in the form of individual unground crystals, substantially all of which are of the order of one micron in size.

2. Zinc ortho-silicate as set forth in claim 1 in which the crystals contain 1½ to 2% of manganese dioxide.

3. Zinc ortho-silicate as described in claim 1 in which the material has been prepared from interaction of silicic acid and zinc oxide.

4. The method of preparing an activated fluorescent material which comprises mixing a plurality of fine powders in reacting proportion to form a fluorescent material, the powders including an activator when necessary, continuing the mixing until one of said reacting powders is coated substantially uniformly with the remaining powder or powders, and then heating the resulting mixture to cause interaction of the individual particles without any substantial enlargement or interfusion of particles, whereby a mass of minute individual particles of fluorescent material is produced which may be readily crumbled without grinding to free the individual minute particles.

5. The method as set forth in claim 4 in which the powders include zinc oxide and silicic acid.

6. The method of preparing zinc silicate which comprises thoroughly and gently mixing silicic acid and zinc oxide, heating the resulting mixture at a temperature below 2400° F. and above 2250° F. for a period sufficient to interact the zinc oxide and silicic acid and produce zinc or ortho-silicate without any substantial fusing or sintering of the mass.

7. The method of preparing zinc silicate which comprises thoroughly and gently mixing silicic acid and zinc oxide and an activator, heating the resulting mixture at a temperature below 2400° F. and above 2250° F. for a period sufficient to interact the zinc oxide and silicic acid and produce zinc ortho-silicate without any substantial fusing or sintering of the mass.

8. A new composition of matter consisting of activated zinc silicate in unbroken particles substantially entirely below 2 microns in size.

9. The method as set forth in claim 4, in which the fluorescent material is a silicate.

10. The method as set forth in claim 4, in which the fluorescent material is a silicate and the particles produced are of the order of 1 micron in size.

11. A fluorescent element comprising a base having upon its surface thereof a film of fluorescent silicate material in the form of individual unground crystals, substantially all of which are of the order of 1 micron in size.

12. A fluorescent element comprising a base having thereon a coating of zinc silicate material in the form of individual unground crystals, substantially all of which are of the order of 1 micron in size.

13. A fluorescent element comprising a glass base having thereon a coating of fluorescent silicate material in the form of individual unground crystals, substantially all of which are of the order of 1 micron in size, the fluorescent material firmly adhering to the base without a binder.

14. A binder free cake consisting essentially of a fluorescent silicate in the form of unground crystals substantially all below 2 microns in diameter, very lightly held together, the cake being easily divisible to the individual crystals by light shock without rupture of the crystals.

15. Fluorescent zinc ortho-silicate in the form of loosely flocculent individual unground crystals, substantially all of which are below 2 microns in size.

CARL PFANSTIEHL.

---

CERTIFICATE OF CORRECTION.

Patent No. 2,176,099.                    October 17, 1939.

CARL PFANSTIEHL.

It is hereby certified that error appears in the printed specification of the above numbered patent requiring correction as follows: Page 1, first column, line 5, for "Fuorescent" read Fluorescent; page 2, second column, line 31, claim 1, before the word "material" insert silicate; line 63, claim 6, strike out "or"; and that the said Letters Patent should be read with this correction therein that the same may conform to the record of the case in the Patent Office.

Signed and sealed this 5th day of December, A. D. 1939.

(Seal)

Henry Van Arsdale,
Acting Commissioner of Patents.

activated zinc silicate in unbroken particles substantially entirely below 2 microns in size.

9. The method as set forth in claim 4, in which the fluorescent material is a silicate.

10. The method as set forth in claim 4, in which the fluorescent material is a silicate and the particles produced are of the order of 1 micron in size.

11. A fluorescent element comprising a base having upon its surface thereof a film of fluorescent silicate material in the form of individual unground crystals, substantially all of which are of the order of 1 micron in size.

12. A fluorescent element comprising a base having thereon a coating of zinc silicate material in the form of individual unground crystals, substantially all of which are of the order of 1 micron in size.

13. A fluorescent element comprising a glass base having thereon a coating of fluorescent silicate material in the form of individual unground crystals, substantially all of which are of the order of 1 micron in size, the fluorescent material firmly adhering to the base without a binder.

14. A binder free cake consisting essentially of a fluorescent silicate in the form of unground crystals substantially all below 2 microns in diameter, very lightly held together, the cake being easily divisible to the individual crystals by light shock without rupture of the crystals.

15. Fluorescent zinc ortho-silicate in the form of loosely flocculent individual unground crystals, substantially all of which are below 2 microns in size.

CARL PFANSTIEHL.

CERTIFICATE OF CORRECTION.

Patent No. 2,176,099.   October 17, 1939.

CARL PFANSTIEHL.

It is hereby certified that error appears in the printed specification of the above numbered patent requiring correction as follows: Page 1, first column, line 5, for "Fuorescent" read Fluorescent; page 2, second column, line 31, claim 1, before the word "material" insert silicate; line 63, claim 6, strike out "or"; and that the said Letters Patent should be read with this correction therein that the same may conform to the record of the case in the Patent Office.

Signed and sealed this 5th day of December, A. D. 1939.

Henry Van Arsdale,
Acting Commissioner of Patents.

(Seal)